(12) United States Patent
Covell et al.

(10) Patent No.: US 7,143,047 B2
(45) Date of Patent: Nov. 28, 2006

(54) TIME-SCALE MODIFICATION OF DATA-COMPRESSED AUDIO INFORMATION

(75) Inventors: Michele M. Covell, Los Altos Hills, CA (US); Malcolm Slaney, Los Altos Hills, CA (US); Arthur Rothstein, San Francisco, CA (US)

(73) Assignee: Vulcan Patents LLC, Seattle, WA (US)

( * ) Notice: Subject to any disclaimer, the term of this patent is extended or adjusted under 35 U.S.C. 154(b) by 227 days.

(21) Appl. No.: 10/944,456

(22) Filed: Sep. 17, 2004

(65) Prior Publication Data

US 2005/0131683 A1 Jun. 16, 2005

Related U.S. Application Data

(63) Continuation of application No. 09/660,914, filed on Sep. 13, 2000, now Pat. No. 6,842,735.

(51) Int. Cl.
*G10L 21/04* (2006.01)
(52) U.S. Cl. .............. 704/503; 704/500; 704/211; 704/200.1
(58) Field of Classification Search ........ 704/500–504, 704/211, 207, 200.1
See application file for complete search history.

(56) References Cited

U.S. PATENT DOCUMENTS 5,687,191 A * 11/1997 Lee et al. ............... 375/216
5,781,888 A * 7/1998 Herre ..................... 704/200.1
5,956,674 A * 9/1999 Smyth et al. ............ 704/200.1
5,974,380 A * 10/1999 Smyth et al. ............ 704/229
6,148,288 A * 11/2000 Park ....................... 704/500
6,842,735 B1 * 1/2005 Covell et al. ............ 704/503

OTHER PUBLICATIONS

Covell, Michele, et al, "Time-Scale Modification of Bit-Compressed Audio Information", Interval Research Corporation.
Pan, Davis, "A Tutorial on MPEG/Audio Compression", IEEE Multimedia Journal, Summer 1995.
Slager, Matthew, "MPEG/Audio", Dec. 15, 1997, University of Waterloo.
Unknown author, "e-conomist, What is MPEG-Audio then?", Aug. 23, 2000, MPC FAQ from Fraunhofer Institute, http://users.hol.gr/~ctipper/MP3-FAQ.htm.
Unknown author, "Sub-Band Coding", Aug. 23, 2000, Otolith on line tutorials, http://www.otolith.com/pub/u/howitt/sbc.tutorial.html.
Unknown author, "4.3 Audio Compression", Aug. 23, 2000, http://www/cs/sfu.ca/undergrad/CourseMa...terial/notes/Chap4/Chap4.3/Chap4.3html.

* cited by examiner

*Primary Examiner*—Vijay Chawan
(74) *Attorney, Agent, or Firm*—Van Pelt, Yi and James LLP (57) ABSTRACT

A data-compressed audio waveform is temporally modified without requiring complete decompression of the audio signal. Packets of compressed audio data are first unpacked, to remove scaling that was applied in the formation of the packets. The unpacked data is then temporally modified, using one of a number of different approaches. This modification takes place while the audio information remains in a data-compressed format. New packets are then assembled from the modified data, to produce a data-compressed output stream that can be subsequently processed in a conventional manner to reproduce the desired sound. The assembly of the new packets employs a technique for inferring an auditory model from the original packets, to requantize the data in the output packets.

31 Claims, 8 Drawing Sheets

TIME-SCALE MODIFICATION OF DATA-COMPRESSED AUDIO INFORMATION

CROSS-REFERENCE TO OTHER APPLICATIONS

This is a continuation of prior application Ser. No. 09/660,914, filed Sep. 13, 2000, now U.S. Pat. No. 6,842,735, issued Jan. 11, 2005, which is hereby incorporated by reference.

FIELD OF THE INVENTION

The present invention is directed to the temporal modification of audio signals, to increase or reduce playback rates, and more particularly to the temporal modification of audio signals that have undergone data compression.

BACKGROUND OF THE INVENTION

In the context of audio signals, the term "compression" can have two different meanings. "Temporal compression" refers to an increase in the speed at which a recorded audio signal is reproduced, thereby reducing the amount of time required to play back the signal, relative to the original recording. "Data compression" refers to a reduction in the number of bits that are used to represent an audio signal in a digital format. The present invention is concerned with both types of compression of an audio signal, as well as temporal expansion to slow down the reproduction rate.

There are a variety of techniques that are employed to effect the temporal compression and expansion of audio, so that it can be played back over periods of time which are less than, or greater than, the period over which it was recorded. Each technique has its associated advantages and limitations, which makes each one more or less suitable for a given application. One of the earliest examples of temporal compression is the "fast playback" approach. In this approach, a recorded audio signal is reproduced at a higher rate by speeding up an analog waveform, e.g., transporting a magnetic tape at a faster speed during playback than the recording speed. The digital equivalent of this approach is accomplished with low-pass filtering the waveform, sub-sampling the result, and then playing back the new samples at the original sampling rate. Conversely, by reducing the speed of playback, the audio waveform is expanded. In the digital context, this result can be accomplished by up-sampling the waveform, low-pass filtering it, and playing it back at the original sampling rate. This approach has the advantage of being extremely simple to implement. However, it has the associated disadvantage of shifting the pitch of the reproduced sound. For instance, as the playback rate is increased, the pitch shifts to a higher frequency, giving speech a "squeaky" characteristic.

Another approach to the temporal compression of audio is known as "snippet omission". This technique is described in detail, for example in a paper published by Gade & Mills entitled "Listening Rate and Comprehension as a Function of Preference for and Exposure to Time-Altered Speech," *Perceptual and Motor Skills*, volume 68, pages 531–538 (1989). In the analog domain, this technique is performed with the use of electromechanical tape players having moving magnetic read heads. The players alternately reproduce and skip short sections, or snippets, of a magnetic tape. In a digital domain, the same result is accomplished by alternately maintaining and discarding short groups of samples. To provide temporal expansion using this approach, each section of the tape, or digital sample, is reproduced more than once. The snippet omission approach has an advantage over the fast playback approach, in that it does not shift the pitch of the original input signal. However, it does result in the removal of energy from the signal, and offsets some of the signal energy in the frequency domain according to the lengths of the omitted snippets, resulting in an artifact that is perceived as a discernable buzzing sound during playback. This artifact is due to the modulation of the input signal by the square wave of the snippet removal signal.

More recently, an approach known as Synchronous Overlap-Add (SOLA) has been developed, which overcomes the undesirable effects associated with each of the two earlier approaches. In essence, SOLA constitutes an improvement on the snippet omission approach, by linking the duration of the segments that are played or skipped to the pitch period of the audio, and by replacing the simple splicing of snippets with cross-fading, i.e. adjacent groups of samples are overlapped. Detailed information regarding the SOLA approach can be found in the paper by Roucous & Wilgus entitled "High Quality Time-Scale Modification for Speech," *IEEE International Conference on Acoustics, Speech and Signal Processing*, Tampa, Fla., volume 2, pages 493–496 (1985). The SOLA approach does not result in pitch shifting, and reduces the audible artifacts associated with snippet omission. However, it is more computationally expensive, since it requires analysis of local audio characteristics to determine the appropriate amount of overlap for the samples.

Figure 1:
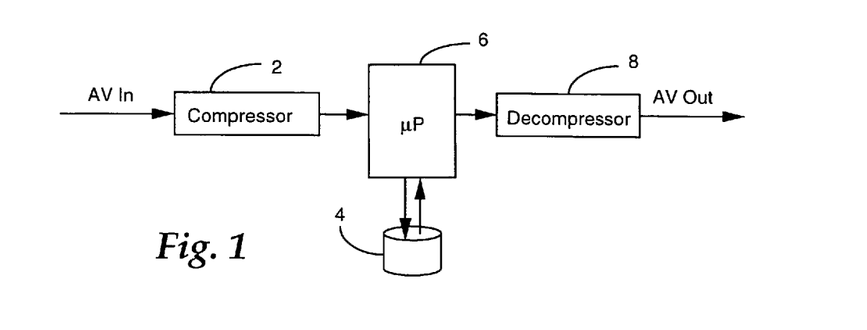
FIG. 1 is a block diagram of the main components of a personal video recorder.

Digital audio files are now being used in a large number of different applications, and are being distributed through a variety of different channels. To reduce the storage and transmission bandwidth requirements for these files, it is quite common to perform data compression on them. For example, one popular form of compression is based upon the MPEG audio standard. Some applications which are designed to handle audio files compressed according to this standard may include dedicated decompression hardware for playback of the audio. One example of such an application is a personal video recorder, which enables a viewer to digitally record a broadcast television program or other streaming audio-video (AV) presentation, for time-shifting or fast-forward purposes. The main components of such a system are illustrated in FIG. 1. Referring thereto, when an incoming AV signal is to be recorded for later viewing, it is fed to a compressor 2, which digitizes the signal if it is not already in a digital format, and compresses it according to any suitable compression technique, such as MPEG. Alternatively, in a digital transmission system, the incoming signal may already be in a compressed format.

The compressed AV signal is stored as a digital file on a magnetic hard disk or other suitable storage medium 4, under the control of a microprocessor 6. Subsequently, when the viewer enters a command to resume viewing of the presentation, the file is retrieved from the storage medium 4 by the microprocessor 6, and provided to a decompressor 8. In the decompressor, the file is decompressed to restore the original AV signal, which is supplied to a television receiver for playback of the presentation. Since the compression and decompression functions are performed by dedicated components, the microprocessor itself can be a relatively low-cost device. By minimizing costs in this manner, the entire system can be readily incorporated into a set-top box or other similar types of consumer device.

One of the features of the personal video recorder is that it permits the viewer to pause the display of the presentation, and then fast-forward through portions that were recorded during the pause. However, in applications such as this, temporal modification of the audio playback to maintain concurrency with the fast-forwarded video is extremely difficult. More particularly, the conventional approach to the modification of compressed audio is to decompress the file to reconstruct the original audio waveform, temporally modify the decompressed audio, and then recompress the result. However, the main processor 6 may not have the capability, in terms of either processing cycles or bandwidth, to be able to perform all of these functions. Similarly, the decompressor 8 would have to be significantly altered to be able to handle temporal modification as well as data decompression. Consequently, temporal modification of the playback is simply not feasible in many devices which are designed to handle data-compressed audio files.

It is an objective of the present invention to provide for the modification of a data-compressed audio waveform so that it can be played back at speeds that are faster or slower than the rate at which it was recorded, without having to modify the decompression board, and without requiring that the audio waveform be completely decompressed within the main processor of a device.

SUMMARY OF THE INVENTION

In accordance with the present invention, the foregoing objective is achieved by a process in which packets of compressed audio data are first unpacked to remove scaling that was applied to the data during the packet assembly process. The unpacked data is then temporally modified, using any one of a variety of different approaches. This modification takes place while the audio information remains in a data-compressed form. New packets are then assembled from the modified data to produce a data-compressed output stream that can be sent to a decompressor, or stored for later use.

The temporal modification of the unpacked data results in a fewer or greater number of data packets, depending upon whether the audio signal is to be temporally compressed or expanded. As a further feature of the invention, information that is derived from the packets during the unpacking process is used to form a hypothesis of the number of quantization levels to be employed in the new, modified packets. These hypotheses are adjusted, as appropriate, to provide packets of a size that conform to the amount of compression required for a given application.

Further features of the invention, and the advantages obtained thereby, are discussed in detail hereinafter, with reference to exemplary embodiments illustrated in the accompanying drawings.

DETAILED DESCRIPTION

To facilitate an understanding of the present invention, it is described hereinafter with reference to specific examples which illustrate the principles of the invention. In these examples, audio waveforms are temporally compressed or expanded at a 2:1 ratio. It will be appreciated, however, that these examples are merely illustrative, and that the principles of the invention can be utilized to provide any desired ratio of temporal compression or expansion. Furthermore, specific examples are discussed with reference to the use of MPEG-1 layer II compression of the audio data files, also known as MP2. Again, however, the principles of the invention can be employed with other types of data compression as well, such as MP3.

1. MPEG Background

Figure 2:
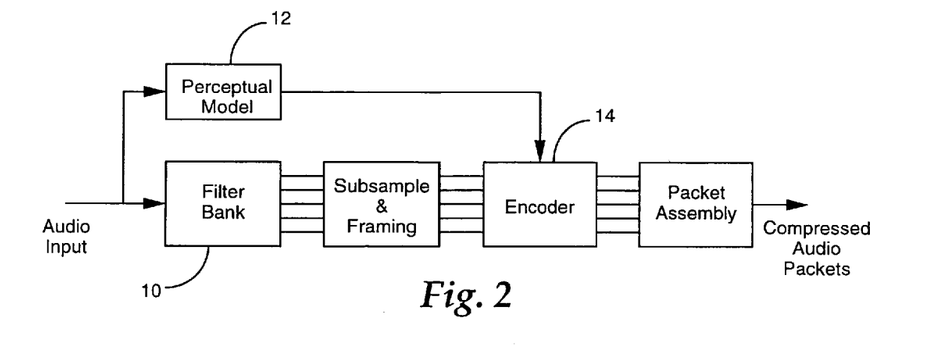
FIG. 2 is a general block diagram of a system for compressing audio data.

The present invention is directed to a technique for temporally modifying an audio waveform that is in a data-compressed format. For a thorough understanding of this technique, a brief overview of audio data compression will first be provided. FIG. 2 is a general block diagram of an audio signal compression system, which could be included in the compressor 2 of FIG. 1. The particular system depicted in this figure conforms with the MP2 standard. MPEG compression is commonly employed for the compression of audio files that are transmitted over the Internet and/or utilized in disk-based media applications. Referring to the figure, an audio signal which may contain speech, music, sound effects, etc., is fed to a filter bank 10. This filter bank divides the audio signal into a number of subbands, i.e. 32 subbands in the MPEG format. In accordance with the MP2 standard, each of the subbands has the same spectral width. If a different standard is employed, however, the subbands may have different widths that are more closely aligned with the response characteristics of the human auditory system. Each of the filters in the filter bank 10 samples the audio signal at a designated sampling rate, to provide a time-to-frequency mapping of the audio signal for the particular range of frequencies associated with that filter's subband.

Figure 3:
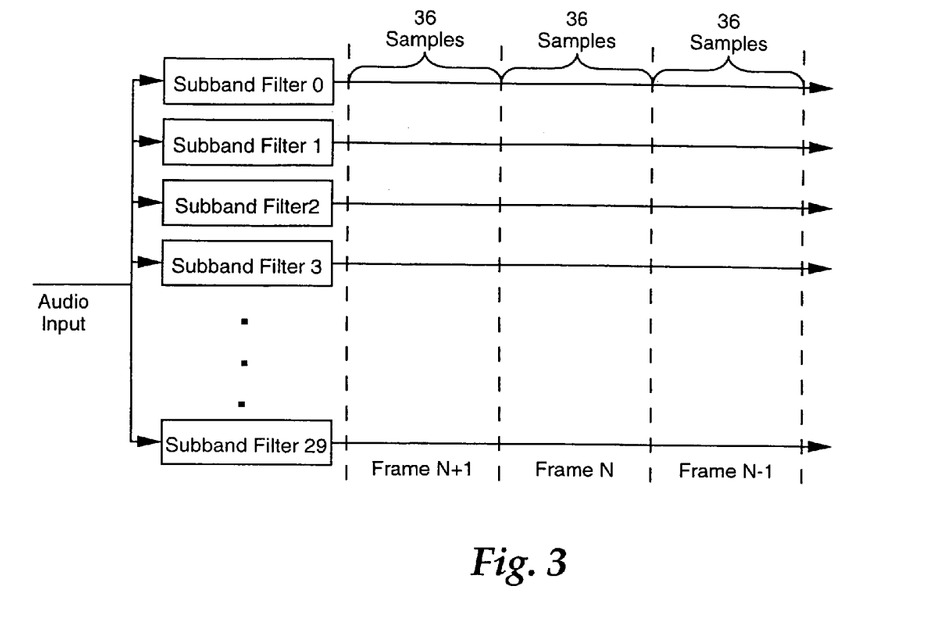
FIG. 3 illustrates the manner in which the subbands of audio samples are grouped into frames.

The filter bank 10 produces thirty-two subband output streams of audio samples, which can be critically sub-sampled, for example by a factor of thirty-two. The subbands for the two highest frequency ranges are discarded, thereby providing thirty maximally decimated subband streams. The samples in each of these streams are then grouped into frames, to form transmission packets. Referring to FIG. 3, each frame contains thirty-six samples from each sub-sampled subband, thereby providing a total of 36×30=1,080 samples per frame. If a compression technique other than MPEG is employed, the number of subbands and/or the number of samples per packet may be different.

The audio input signal is also supplied to a perceptual model 12. In the case of MPEG compression, this model analyzes the signal in accordance with known characteristics of the human auditory system. This model functions to identify acoustically irrelevant parts of the audio signal. By removing these irrelevant portions of the signal, the resulting data can be significantly compressed. The structure and operation of the model itself is not specified by the compression standard, and therefore it can vary according to application, designer preferences, etc.

Figure 4:
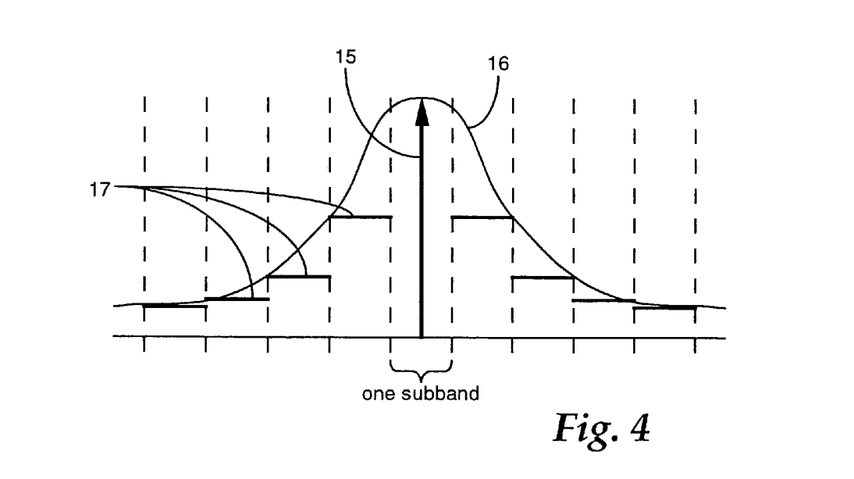
FIG. 4 is an illustration of the masking effect that is employed for MPEG audio compression.

The sub-sampled frames of data are provided to a data encoder 14, which also receives the results of the analysis performed by the perceptual model 12. The information from the model 12 essentially indicates the amount of relevant acoustic data in each of the subbands. More particularly, the perceptual model identifies the amount of masking that occurs within the various subbands. Referring to FIG. 4, one characteristic of the human auditory system is that a relatively high magnitude signal 15 at one frequency will mask out lower-magnitude signals at nearby frequencies. The degree of masking which occurs is identified by a masking profile 16. Based on such masking profiles, the perceptual model determines a minimum sound level 17 for each subband, below which sounds will not be perceived. This information can then be used to determine the degree of resolution that is required to represent the signal in that subband. For example, if the signals in a subband have a maximum range of 60 dB, but the masking level 17 for that subband is 35 dB, the output data only needs to be able to represent a range of 25 dB, i.e. 60 dB–35 dB. Thus, when quantizing the signal, any noise that is introduced the is 25 dB down will not be heard.

Using this information, the encoder 14 assigns a number of quantization levels to each subband for that frame, in accordance with the amount of relevant acoustic data contained within that subband. A number of bits for encoding the data is associated with each quantization level. The magnitude of the relevant data in the subband is scaled by an appropriate factor, to ensure the highest possible signal-to-noise ratio after quantization.

After the appropriate number of bits has been assigned to each of the subbands in a frame, and the appropriate scaling is determined, the scaled data is quantized in accordance with the allocated number of bits. This quantized data is then assembled with an appropriate header that indicates the allocation of bits and scale factors for each of the subbands, to form a data packet.

Figure 5:
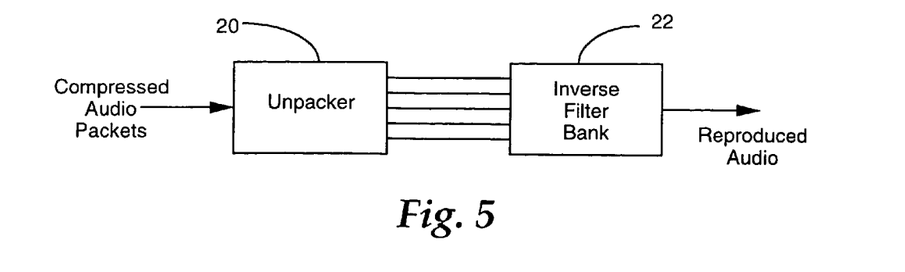
FIG. 5 is a block diagram of a data decompression system.

FIG. 5 is a block diagram illustrating the general components of a decompressor 8 for handling audio data which has been compressed by a system such as that shown in FIG. 2. A data-compressed audio packet is first presented to a bit stream unpacker 20, which removes the header data and, using the bit allocation and scaling factors in this data, restores the quantized subband sample values. These values are upsampled and fed to an inverse filter bank 22, which reconstructs the audio signal from the subband signals. As discussed in connection with FIG. 1, the hardware and software components that perform the reconstruction of the audio signal from the subband signals, including the inverse filter bank 22, may be contained on a dedicated decompressor 8, to thereby offload this computationally intensive procedure from the main processor 6 in a device which is handling the compressed audio files. For example, the decompressor may be contained in a dedicated chip within an audio playback device that has an inexpensive main processor. The function of unpacking the compressed file may also be performed by this dedicated hardware, or can be carried out in the main processor of the device, since it is less complex than the full decompression operation.

2. Invention Overview

Figure 6:
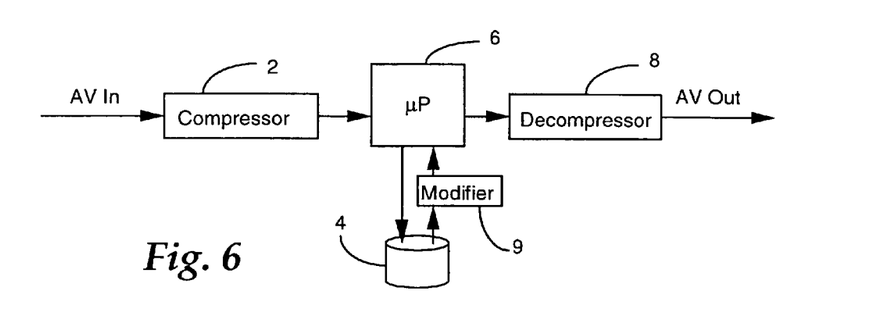
FIG. 6 is a general block diagram of one example of an audio playback system incorporating the present invention.

In accordance with the present invention, time-scale modification is performed on an audio file that is in a data-compressed format, without the need to reconstruct the audio signal from the subband signals. One example of a system which incorporates the present invention is shown in FIG. 6. This particular example corresponds to the personal video recorder depicted in FIG. 1. In this example, when the compressed audio file is retrieved from the storage medium 4, it is provided to a temporal modifier 9. The temporal modifier performs temporal compression or expansion of the audio file, as appropriate, and then forwards the modified file, in a data compressed format, to the microprocessor 6, whereupon it is sent to the decompressor 8, for playback. While the temporal modifier 9 is depicted as a device which is separate from the main processor 6, for ease of understanding, it will be appreciated that the features of this device can be implemented within the processor itself by means of appropriate software instructions.

Figure 7:
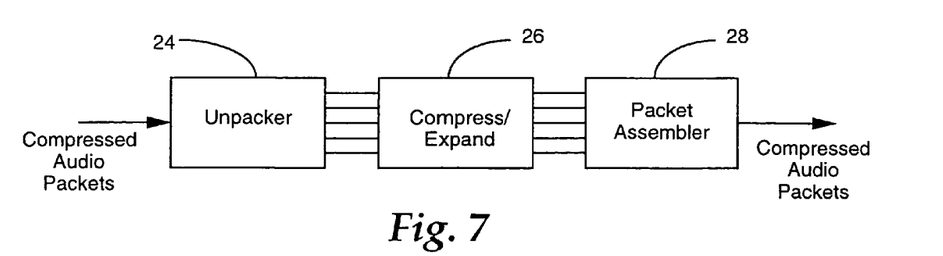
FIG. 7 is a general block diagram of a system for temporally modifying data-compressed audio in accordance with the present invention.

The general components of the temporal modifier 9 are illustrated in FIG. 7. Referring thereto, the compressed audio file is provided to an unpacker 24, where it undergoes unpacking in a conventional manner, i.e., header information in a packet is used to undo the scaling of the data stream, to thereby restore the subband signals. Once the subband signals have been restored through the unpacking process, the samples in the packets are modified to provide the appropriate temporal compression or expansion, in a temporal compressor/expander 26. For example, if a 2:1 compression ratio is to be achieved, the samples in two successive packets are selectively combined into a single packet. Once the samples have been processed, the modified data is reassembled into appropriate data packets in a packet assembler 28, in conformance with the compression technique that was originally employed. Hence, data-compressed audio waveforms can be temporally modified without having to alter decompression board software or hardware, and without having to completely reconstruct the audio signal from the decompressed data within a main processor, or the like.

3. Modification Techniques

The modification of the unpacked data to perform temporal compression or expansion in the compressor/expander can be carried out in a number of different manners. Each of these approaches is described hereinafter with reference to particular examples in which the audio playback rate is increased or reduced by a factor of 2:1. The extension of this technique to other modification ratios will be readily apparent from the following description.

A. Sample Selection

Figure 8:
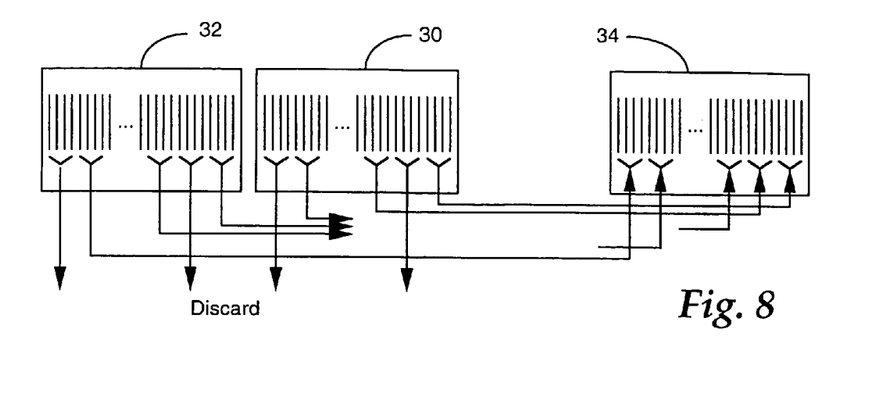
FIG. 8 illustrates a first embodiment of the invention for temporally modifying audio data.

One approach to the modification of the unpacked data which can be achieved with minimal computation employs selective retention and discarding of samples in packets, in a manner that roughly corresponds to "snippet omission". FIG. 8 illustrates an example in which the audio waveform undergoes 2:1 temporal compression. Referring thereto, two successive input packets 30 and 32 are unpacked, to provide 72 samples per subband. A new output stream is constructed by saving the first N samples of a subband into an output packet 34. After the first N samples have been saved, the next N samples are discarded. This process is repeated for all subbands, until all 72 samples per subband have been selectively saved or discarded, to produce a new frame of 36 samples per subband.

Time-scale expansion can be achieved in a similar manner. In this case, however, upon receiving a new packet, the first N samples of that packet are placed into an output packet. The same N samples are then repeated in the output packet. The next N samples of the input packet are then placed into the output packet, and again repeated. This process of duplicating the samples in the output packet is performed for all 36 input samples, to produce two output packets containing a total of 72 samples.

Preferably, for a temporal compression ratio of 2:1, N is chosen so that it is a divisor of 36 (i.e., N=2, 3, 4, 6, 9, 12, 18 or 36). Even more preferably, the higher ones of these values are employed for N, to reduce the frequency of the "splices" that result in the output packet, and thereby reduce the number of artifacts in the resulting audio signal when it is reproduced. If N is other than one of these divisor values, two input packets will not fit exactly into one output packet. Rather, some of the samples from an input packet will be left over after one output packet has been constructed. In this case, it may be necessary to allocate a buffer to store these remaining samples until the next input packets are received. These buffered samples are first processed, i.e., either maintained or discarded, when the next output packet is constructed.

B. Spectral Range Modification

Figure 9A:
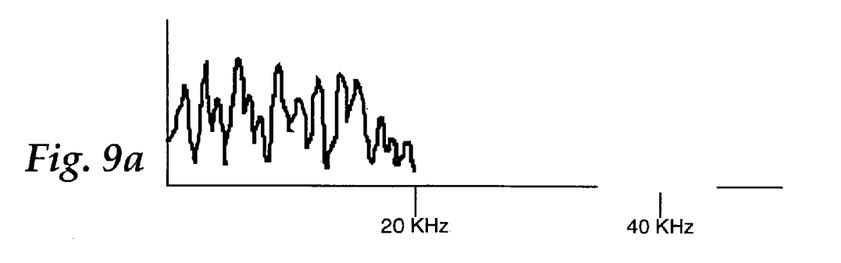
FIGS. 9a–9c illustrate the effect of fast playback on the frequency spectrum of a signal.
Figure 9B:
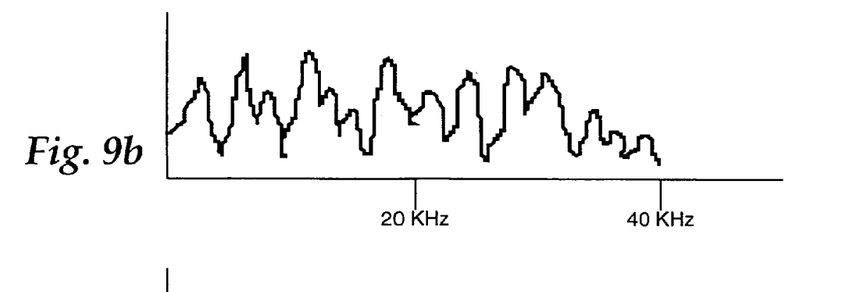
Figure 9C:
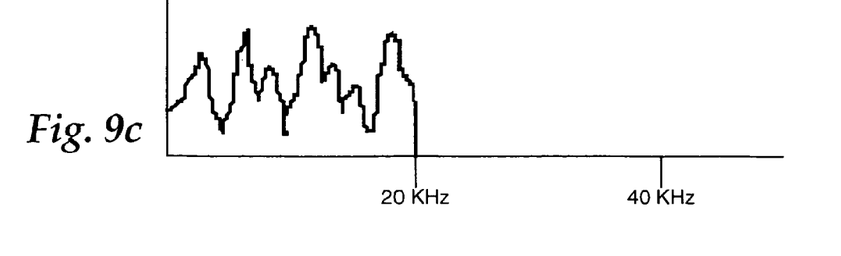

A second approach to the modification of the unpacked data can be employed which corresponds to the "fast playback" technique. When fast playback is employed for temporal compression, the frequency domain structure of the audio signal is increased. In the digital domain, only the bottom half of the original spectrum is retained, and that bottom half expands linearly to cover the full range from zero to the Nyquist rate. Referring to FIG. 9a, if the Nyquist rate for a signal is 20 KHz, the original audio signal covers the range of 0–20 KHz. A 2:1 speedup of the signal expands its frequency range to 0–40 Khz as shown in FIG. 9b, since all of the frequencies in the signal are doubled. However, any signal at a frequency above the Nyquist rate is aliased, according to sampling theory. As a result, only the bottom half of the original frequency range is retained in the temporally compressed signal, as depicted in FIG. 9c.

In the context of the present invention, this frequency shifting behavior is simulated in the maximally decimated frequency domains of the subband streams. To generate an output packet, two input packets are unpacked, to provide 72 samples per subband. The samples in the subbands which correspond to the upper half of the original frequency range are discarded. To reduce computational requirements, the data for the upper half of the subbands in the two packets can be discarded prior to the unsealing of the data during the unpacking process. The data in the remaining half of the subbands, which correspond to the lower frequency bands, is then unscaled to restore the subband signals.

Figure 10:
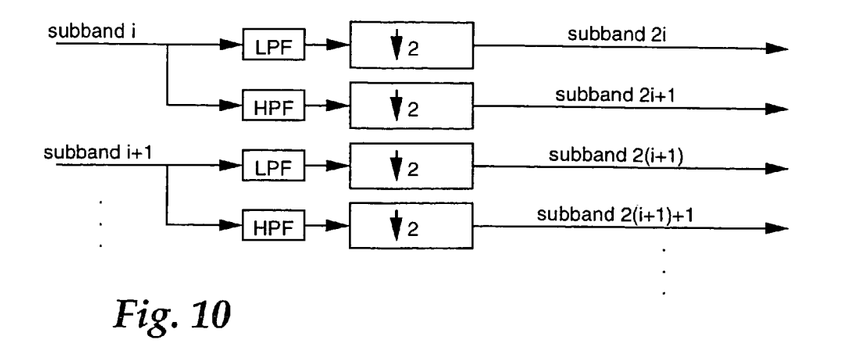
FIG. 10 illustrates a second embodiment of the invention for temporally modifying audio data.

Referring to FIG. 10, the samples from each remaining subband are fed to both a low-pass filter and a high-pass filter. Each filter produces 72 samples, which are then downsampled by two, to provide 36 samples. The 36 samples from the low-pass filter form the data for one subband in the output packet, and the 36 samples from the high-pass filter form the data for the next highest subband in the output packet. In other words, for the $i^{th}$ subband in the two input packets, where $0 \leq i < 14$, the low-pass samples from that subband are stored in the $(2i)^{th}$ subband of the output packet, and the high-pass samples from that subband are stored in the $(2i+1)^{th}$ subband in the output packet.

To minimize computational requirements, the low-pass and high-pass filters can be relatively simple functions. For instance, they can be implemented as two-point sums and differences, as follows:

LPF: $(x_i + x_{i+1})/2$

HPF: $(x_i - x_{i+1})/2$ where $x_i$ and $x_{i+1}$ are consecutive samples in a subband.

Figures 11A, 11B:
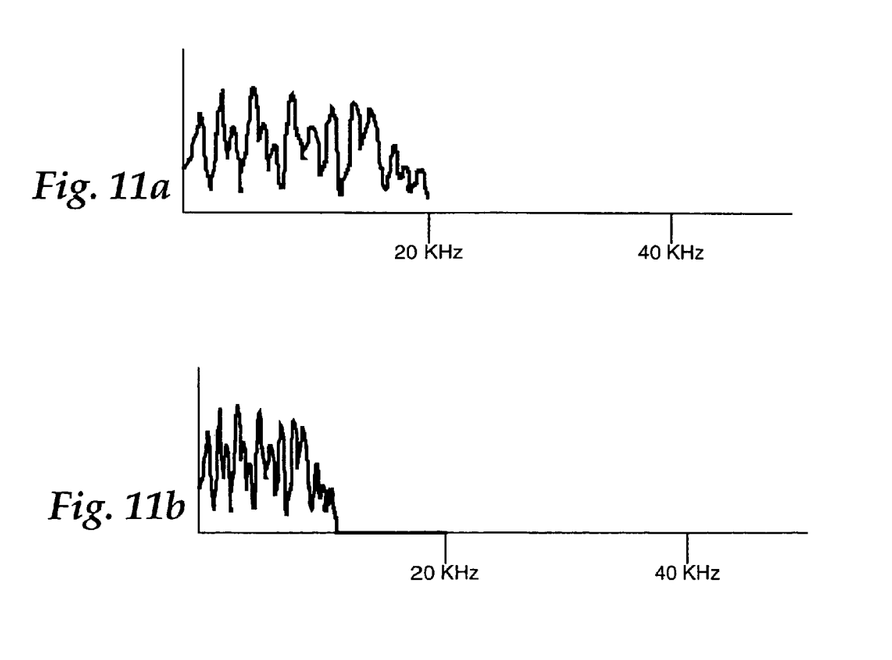
FIGS. 11a and 11b illustrate the effects of slow playback on the frequency spectrum of an audio signal.

For time-scale expansion, a conceptually similar approach can be employed. Referring to FIGS. 11a and 11b, when an audio signal is played back at one-half speed, the original spectral support is compressed by a factor of two. As a result, the upper half of the frequency spectrum for the temporally expanded signal is zero. To implement this concept in the context of the present invention, when an input packet is received, the samples from each subband are up-sampled by two, e.g., by interleaving zeros between the sample values, and low-pass filtered. The upsampled data in the odd-numbered channels is then modulated by $(-1)^n$, where n is the sample number. (Alternatively, the upsampled data in the odd-numbered channels can be high-pass filtered instead of being low-pass filtered and modulated.) Then each pair of adjacent upsampled and filtered data streams is summed and assigned to a corresponding subband in the output packet, i.e. the $(2i)^{th}$ and $(2i+1)^{th}$ input subbands are summed and assigned to the $i^{th}$ subband in the output packet. This fills the subbands in the lower half of the output packet. The subbands in the upper half of the frequency spectrum are all set to zero.

C. Content-Based Selection

A third approach to the time-scale modification is an extension of the sample selection approach described in connection with FIG. 8, and employs principles of the SOLA technique. As discussed in the background portion of the application, when the size of the snippets that are omitted from the original signal is maintained at a constant value, certain artifacts can appear in the modified signal. To reduce these artifacts, in this third approach the length of the omitted portions of the signals are dynamically adjusted in accordance with the content of the signal. Normally, it is sufficient to utilize the content of one subband for determining the optimal lengths of the portions which are to be omitted. In most applications, it may be appropriate to use the lowest frequency subband. However, if the audio input signal is band-limited, such as telephone speech, it may be more preferable to identify the subband which has the maximum energy across the input packets being processed, and to use the information in that subband to determine the correct number of samples to discard.

Figure 12:
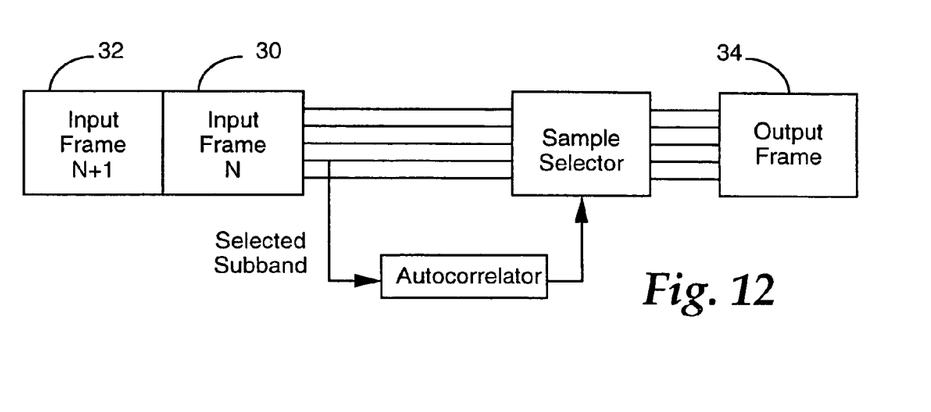
FIG. 12 illustrates a third embodiment of the invention for temporally modifying audio data.
Figure 13:
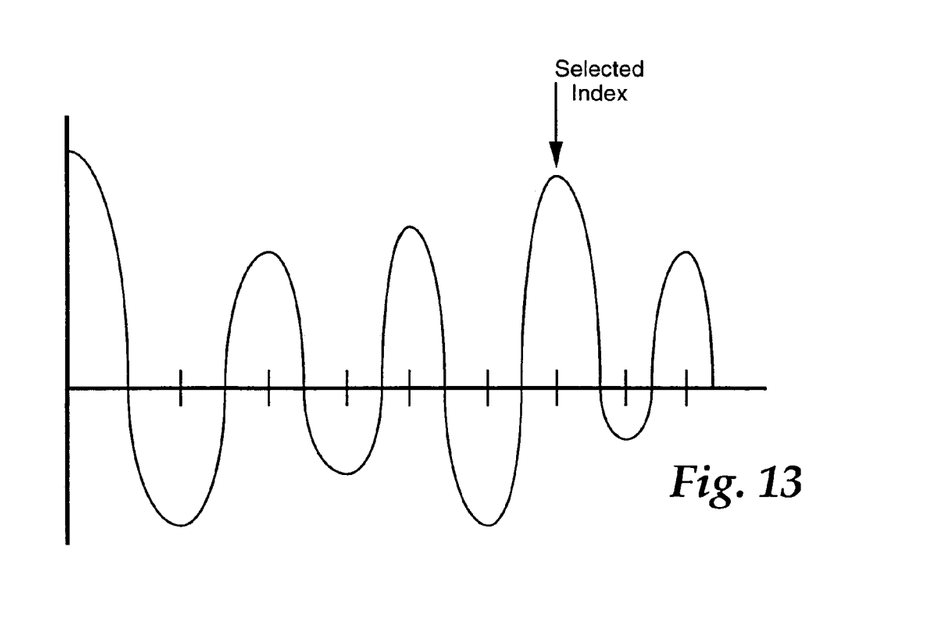
FIG. 13 is a graph illustrating an example of an autocorrelation function.

Referring to FIG. 12, two input packets 30 and 32 are unpacked, and autocorrelation is carried out on a selected subband. The autocorrelation can be performed by adding zeros to the 72 samples, to pad them to a length of 128 points. A real-input fast Fourier transform (FFT) is then performed on the 128 points, and the transformed values are replaced with their magnitude-squared values. A 128-point real-symmetric-input inverse FFT is then performed, to produce a real-value 128-point function that corresponds to the temporally aliased autocorrelation of the original 72 input points of the selected subband. An example of the autocorrelation function is illustrated in FIG. 13. To determine the appropriate omission period, the highest autocorrelation peak following the peak at zero is selected, as indicated by the arrow. The index of this peak, which can be expressed as a number of samples, provides the appropriate omission period to be employed in the pair of input packets. In voiced speech, the optimum omission period is an integer multiple of the pitch period. (Since the present invention does not utilize the outermost peaks represented in the autocorrelation, the temporal aliasing does not affect the results. Care should be taken, however, to avoid considering peaks that have been aliased when choosing the maximum.) Once the appropriate value has been determined, it is employed as the parameter N for the sample selection and omission in the embodiment of FIG. 8, to generate an output packet 34.

4. Packet Reconstruction

Once the audio data has been temporally modified in accordance with any of the foregoing techniques, packets containing the modified data are reconstructed. This reconstruction involves a determination of the appropriate number of quantization levels to use for the modified data. In most audio compression techniques, a significant amount of effort goes into the evaluation of an appropriate perceptual model that determines the psychoacoustic masking properties, and thus the quantization levels for the original data-compressed file. The modified compressed signal resulting from the techniques of the present invention is likely to have different masking levels from the original signal, and hence optimum compression would suggest that the modified values be re-evaluated in an auditory model. To avoid the need for such a model, however, the present invention uses the original quantization levels to infer the appropriate masking levels.

The MPEG standard sets contains particular details relating to the quantization of signals. Referring to Table 1 below, each number of quantization levels has an associated quantizer number Q. Each level also has a predetermined number of bits b(Q) associated with its quantizer number. The MPEG standard includes quantizer values that have non-power-of-2 numbers of levels, such as 5 and 9 levels. To minimize wastage of bits at these levels, samples are considered in groups of three. Accordingly, in the following table, the number of bits b(Q) associated with each quantizer number Q is expressed in terms of the number of bits per three samples.

TABLE 1

| Q | No. of levels | b(Q) |
|---|---|---|
| 0 | 1 | 0 |
| 1 | 3 | 5 |
| 2 | 5 | 7 |
| 3 | 7 | 9 |
| 4 | 9 | 10 |
| 5 | 15 | 12 |
| 6 | 31 | 15 |
| 7 | 63 | 18 |
| 8 | 127 | 21 |
| 9 | 255 | 24 |
| 10 | 511 | 27 |
| 11 | 1023 | 30 |
| 12 | 2047 | 33 |
| 13 | 4095 | 36 |
| 14 | 8191 | 39 |
| 15 | 16383 | 42 |
| 16 | 32757 | 45 |
| 17 | 65535 | 48 |

Figure 14A:
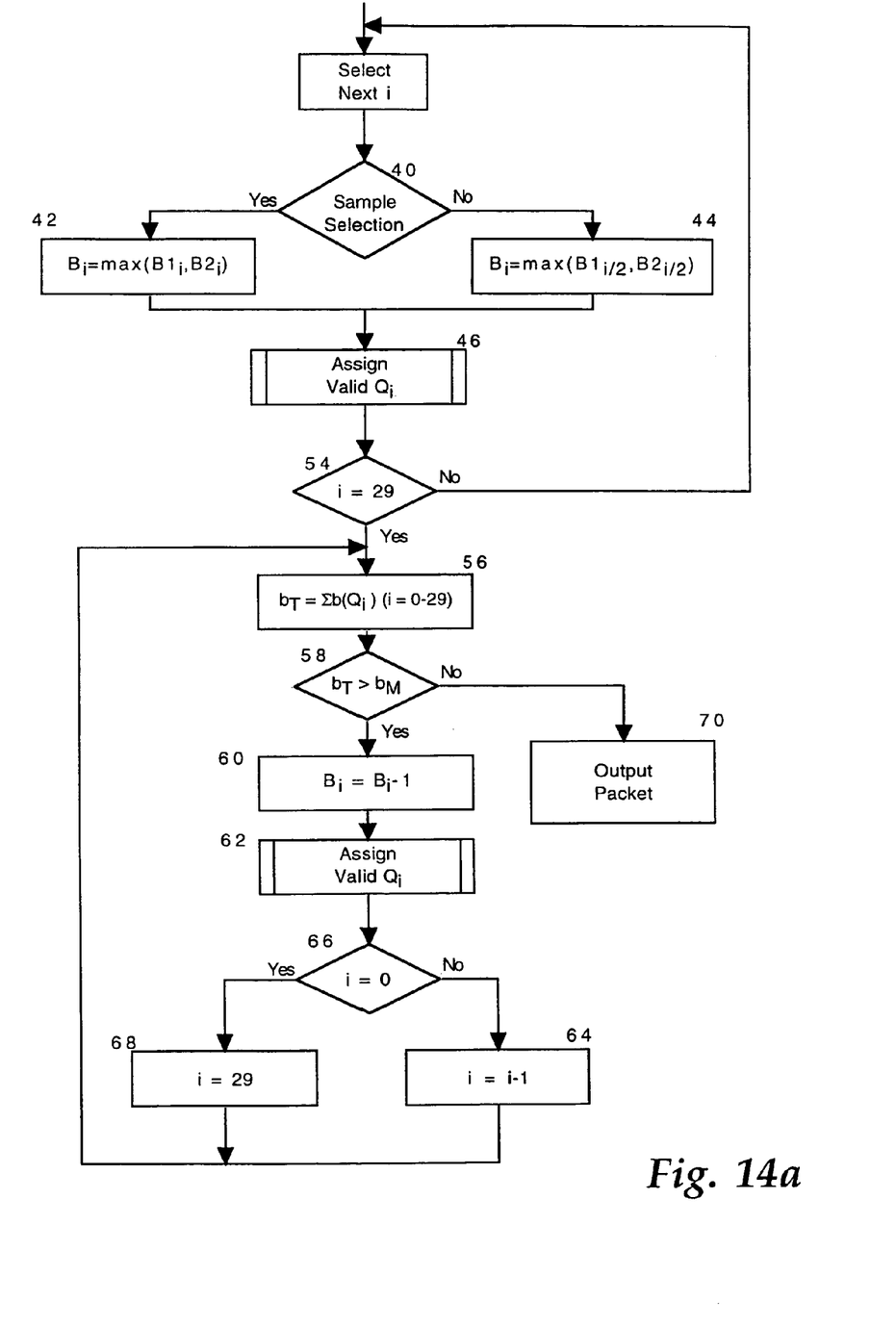
FIGS. 14a and 14b are flow charts illustrating the process of packet reconstruction.
Figure 14B:
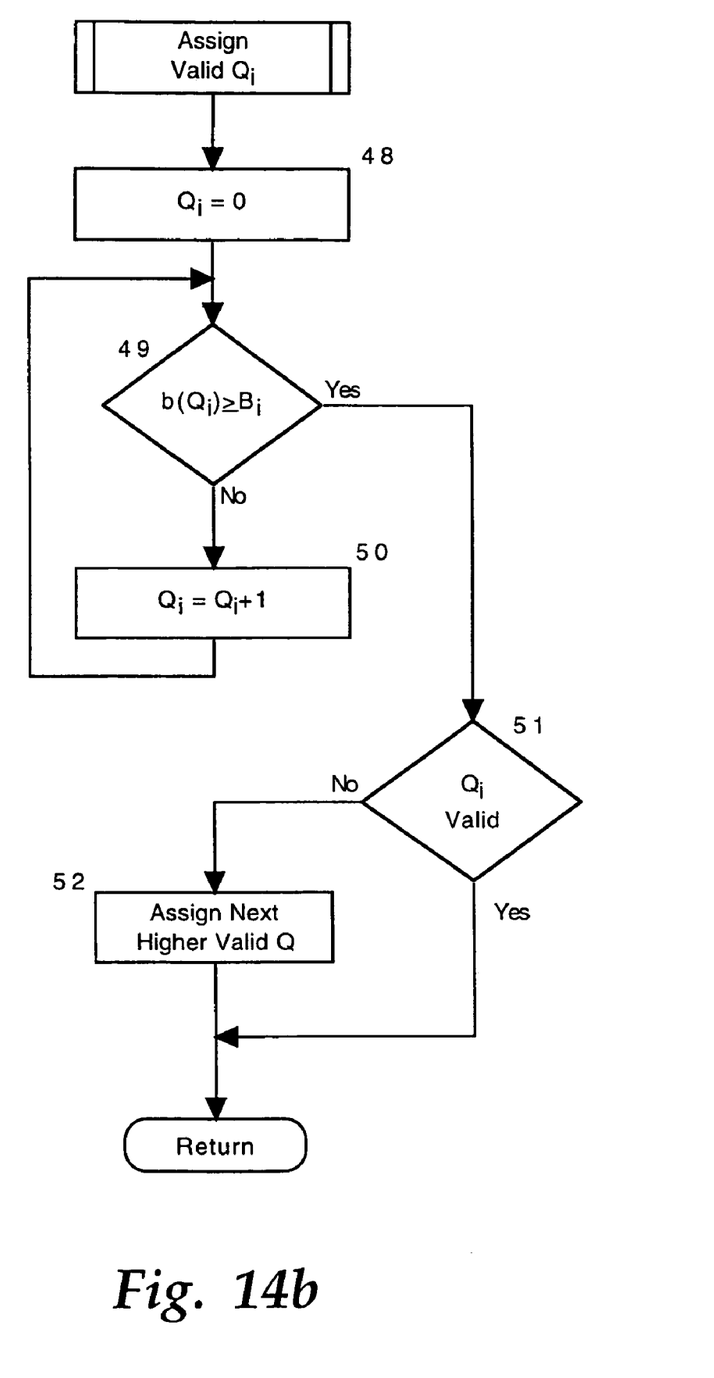

The process for reconstructing a packet after temporal compression by a factor of two is depicted in the flow charts of FIGS. 14*a* and 14*b*. The determination of the appropriate quantizer number begins with the assumption that the number of quantization levels to use in each subband of the output packet is likely to be close to the number of quantization levels employed in the input packets. In general, the quantization levels for any one subband in the output packet will be no greater in number than the maximum number of quantization levels in the corresponding subband(s) of the input packets. Accordingly, an initial bit allocation hypothesis $B_i$ is assigned to each subband. This initial hypothesis corresponds to the maximum of the number of bits that were used in the corresponding subbands of the two input packets. This assignment is dependent upon the particular technique which was employed to modify the data, which is determined at Step 40. For those cases in which the temporal modification of the data is performed by means of sample selection, in accordance with the embodiments of FIGS. 8 or 12, a given subband i in the output packet corresponds to the same subband in each of the two input packets. If the two input packets had bit allocations of $B1_i$ and $B2_i$, respectively, the value for max($B1_i$, $B2_i$) is assigned as the hypothesis $B_i$ for the $i^{th}$ subband in the output packet, at Step 42. If the modification is carried out in accordance with the embodiment of FIG. 10, both the $(2i)^{th}$ and the $(2i+1)^{th}$ subbands in the output packet are assigned an initial bit allocation $B_i$ equal to max ($B1_i$, $B2_i$), at Step 44.

Once an initial bit allocation is made, a valid quantizer number $Q_i$ is assigned to the subband, in a subroutine 46. The procedure that is carried out in this subroutine is illustrated in the flow chart of FIG. 14*b*. At Step 48, the quantizer number $Q_i$ is initially set at the lowest value. Then, at Step 49, the number of bits b($Q_i$) associated with this quantizer number is compared to the number of bits Bi that were allocated to the subband. If b($Q_i$) is greater than or equal to Bi, the quantizer number $Q_i$ is assigned to the subband. However, if the number of bits b($Q_i$) is insufficient, the quantizer number is incremented at step 50. This process continues in an iterative manner until the number of bits b($Q_i$) equals or exceeds the allocated value $B_i$.

The MPEG standard specifies allowable quantization rates for each subband. In the embodiment of FIG. 10, where a subband in the output packet is derived from a different subband in the input packet(s), it is possible that a subband in the output packet could be assigned an initial quantizer number whose number of quantization levels does not conform to the standard. For instance, the 14th and 15th subbands in the output packet are assigned the maximum of the number of quantization levels for the 7th subband in the input packets. It may be the case that this maximum value is not appropriate for these output subbands, and therefore a check is made to see if this condition exists. At Step 51, the assigned quantizer number $Q_i$ is checked against an appropriate table in the standard, to see if it conforms to the standard, for that subband. If it does not, the next higher quantizer number Q which is valid for that subband is selected at Step 52. The procedure then returns to the main routine, and an initial quantizer number $Q_i$ is assigned to the other subbands in the same manner.

Once a detection is made at Step 54 that all the subbands in the output packet have been assigned an initial quantizer number, the total number of bits $b_T$ is determined at Step 56 by summing the number of bits b($Q_i$) associated with the assigned $Q_i$ values for each subband. The total number of bits $b_T$ may be larger than the sum of all of the initial bit allocations $B_i$, due to the manner in which the quantizer numbers $Q_i$ are assigned in the subroutine 46. Furthermore, it is possible that this total could be larger than the number of bits that are permitted per packet according to the compression standard being employed. Accordingly, the value $b_T$ is checked at Step 58, to confirm that the total number of bits is no greater than the maximum number of bits $b_M$ that is permitted for a packet in the compression scheme. If the number of bits that are allocated to all of the subbands in an output packet exceeds the maximum number that is permitted by the data-compression technique being employed, the bit allocation is reduced on a subband-by-subband basis. Starting with the highest frequency subband, i.e. i=29, the number of bits $B_i$ allocated to that subband is reduced by one, at Step 60. The subroutine of FIG. 14b is then carried out at Step 62, to assign a new quantizer number $Q_i$ to the subband, based on the new bit allocation.

The index i is decremented at Step 64, and the process then returns to Step 56 to determine the new value for $b_T$. This new value is checked at Step 58, and if the total number of bits associated with the assigned values for $Q_i$ still exceeds the maximum, the reduction of bit allocations is repeated on subsequently lower subbands at Steps 56–64. A determination is made at Step 66 whether all 30 subbands have been processed in this manner. If the total number of bits still exceeds the maximum, the process returns to the highest-frequency subband at Step 68, and continues in an iterative manner until the total bit assignments $b_T$ falls within the maximum $b_M$ allowed by the compression mode.

Thus, to obtain the acceptable number of bits, the desired number of bits $B_i$ is reduced by one each iteration, and the assigned quantizer number $Q_i$ for the subband follows it, but only in increments that conform to the standard. The actual number of bits follows directly from the assigned values for $Q_i$. Once the total number of allocated bits is acceptable, as detected at Step 58, the samples in each subband are rescaled and encoded, in accordance with the compression standard, to form a new packet at Step 70. In this manner, a valid output packet which combines the contents of two input packets is obtained.

From the foregoing, therefore, it can be seen that the present invention provides a technique which enables the temporal duration of a data-compressed audio waveform to be modified, without first requiring the complete decompression of the waveform. This result is accomplished through modification of audio samples while they are maintained in a compressed format. Only a minimal amount of processing of the compressed data is required to perform this modification, namely the unpacking of data packets to provide unscaled subband sample values. The more computationally intensive processes associated with the decompression of an audio signal, namely the reconstruction of the waveform from the data samples, can be avoided. Similarly, calculation of the auditory masking model in the repacking of the data is also avoided. Hence, it is possible to perform the temporal modification of the compressed audio data in the main processor of a device, without overburdening that processor unnecessarily.

It will be appreciated by those of ordinary skill in the art that the present invention can be embodied in other specific forms, without departing from the spirit or essential characteristics thereof. For instance, while illustrative examples of the invention have been described in connection with temporal compression and expansion ratios of 2:1, it can be readily seen that other modification ratios can be easily achieved by means of the same techniques, through suitable adjustment of the proportions of the input packets which are transferred to the output packets. Similarly, while the invention has been described with particular reference to the MPEG compression standard, other techniques for compressing data which divide the audio signal into subbands and/or employ a perceptual model can also be accommodated with the techniques of the invention.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method of temporally modifying an input audio waveform comprising:
obtaining quantized input data relating to the input audio waveform;
obtaining input samples in a plurality of input frequency subbands representing the input audio waveform using the input data, wherein the input samples are in data compressed format;
selecting input samples for creating output samples in a plurality of output frequency subbands, wherein the output samples are in data compressed format; and
creating output data relating to the temporally modified audio waveform using the output samples.

2. A method as recited in claim 1, wherein the input data is in MPEG format.

3. A method as recited in claim 1, wherein temporally modifying the input audio waveform is temporal compression of the input audio waveform.

4. A method as recited in claim 1, wherein obtaining input samples includes undoing magnitude scaling and quantization to obtain the input samples from the input data.

5. A method as recited in claim 1, wherein creating output data includes determining quantization levels to obtain the output data from the output samples.

6. A method as recited in claim 1, wherein selecting input samples includes dividing the input samples into groups of consecutive input samples and every other group is selected.

7. A method as recited in claim 1, further comprising using the selected input samples to obtain the output samples such that the output samples are groups of consecutive input samples copied a plurality of times.

8. A method as recited in claim 1, wherein selecting input samples includes dividing the input samples into groups of consecutive input samples such that the size of the groups is a higher valued divisor of 72/N where N:1 temporal compression is being performed.

9. A method as recited in claim 1, wherein selecting input samples is such that the input samples for lower input frequency subbands are selected.

10. A method as recited in claim 1, further comprising using the selected input samples to obtain the output samples, comprising:
low pass filtering and downsampling the input sample from selected input frequency subband i to obtain the output sample for output frequency subband 2i; and
high pass filtering and downsampling the input sample from selected input frequency subband i to obtain the output sample for output frequency subband (2i+1).

11. A method as recited in claim 1, further comprising using the selected input samples to obtain the output samples, comprising:
upsampling and low pass filtering the input sample from selected input frequency subband 2i;
upsampling and high pass filtering the input sample from selected input frequency subband (2i+1); and
summing the two upsampled and filtered results to obtain the output sample for output frequency subband i.

12. A method as recited in claim 1, further comprising using the selected input samples to obtain the output samples such that the output samples for higher output frequency subbands are 0.

13. A method as recited in claim 1, wherein selecting input samples includes dividing the input samples into groups of consecutive input samples such that sizes of the groups vary.

14. A method as recited in claim 1, wherein selecting input samples includes dividing the input samples into groups of consecutive input samples such that sizes of the groups are based at least in part on content of the input audio waveform.

15. A method as recited in claim 1, wherein selecting input samples includes dividing the input samples into groups of consecutive input samples such that sizes of the groups are based at least in part on the input subband with the highest energy.

16. A method as recited in claim 1, wherein selecting input samples includes dividing the input samples into groups of consecutive input samples such that sizes of the groups are based at least in part on autocorrelations of the input samples.

17. A method as recited in claim 1, wherein creating output data includes initially assigning a number of bits for one of the output subbands to be max ($B1_i$, $B2_i$) where $B1_i$ and $B2_i$ are number of bits for the input samples which the output sample was created from.

18. A method as recited in claim 1, wherein creating output data includes comparing a quantizer number assigned to one of the output subbands to allowable quantizer numbers for the output subband.

19. A method as recited in claim 1, wherein creating output data includes comparing a sum of number of bits assigned to the output subbands to an allowable total number of bits.

20. A system for temporally modifying an input audio waveform comprising a processor configured to:
    obtain quantized input data relating to the input audio waveform;
    obtain input samples in a plurality of input frequency subbands representing the input audio waveform using the input data, wherein the input samples are in data compressed format;
    select input samples to create output samples in a plurality of output frequency subbands, wherein the output samples are in data compressed format; and
    create output data relating to the temporally modified audio waveform using the output samples.

21. A system as recited in claim 20, wherein selection of input samples includes dividing the input samples into groups of consecutive input samples and every other group is selected.

22. A system as recited in claim 20, further comprising a signal processor configured to:
    low pass filter and downsample the input sample from selected input frequency subband i to obtain the output sample for output frequency subband 2i; and
    high pass filter and downsample the input sample from selected input frequency subband i to obtain the output sample for output frequency subband (2i+1).

23. A system as recited in claim 20, wherein selection of input samples includes dividing the input samples into groups of consecutive input samples such that sizes of the groups vary.

24. A system as recited in claim 20, wherein selection of input samples includes dividing the input samples into groups of consecutive input samples such that sizes of the groups are based at least in part on the input subband with the highest energy.

25. A system as recited in claim 20, wherein creation of output data includes initially assigning a number of bits for one of the output subbands to be max ($B1_i$, $B2_i$) where $B1_i$ and $B2_i$ are numbers of bits for the input samples which the output sample was created from.

26. A computer program product for temporally modifying an input audio waveform, the computer program product being embodied in a computer readable medium and comprising computer instructions for:
    obtaining quantized input data relating to the input audio waveform;
    obtaining input samples in a plurality of input frequency subbands representing the input audio waveform using the input data, wherein the input samples are in data compressed format;
    selecting input samples for creating output samples in a plurality of output frequency subbands, wherein the output samples are in data compressed format; and
    creating output data relating to the temporally modified audio waveform using the output samples.

27. A computer program product as recited in claim 26, wherein selecting input samples includes dividing the input samples into groups of consecutive input samples and every other group is selected.

28. A computer program product as recited in claim 26, the computer program product further comprising computer instructions for creating the output samples comprising:
    low pass filtering and downsampling the input sample from selected input frequency subband i to obtain the output sample for output frequency subband 2i; and
    high pass filtering and downsampling the input sample from selected input frequency subband i to obtain the output sample for output frequency subband (2i+1).

29. A computer program product as recited in claim 26, wherein selecting input samples includes dividing the input samples into groups of consecutive input samples such that sizes of the groups vary.

30. A computer program product as recited in claim 26, wherein selecting input samples includes dividing the input samples into groups of consecutive input samples such that sizes of the groups are based at least in part on the input subband with the highest energy.

31. A computer program product as recited in claim 26, wherein creating output data includes initially assigning a number of bits for one of the output subbands to be max ($B1_i$, $B2_i$) where $B1_i$ and $B2_i$ are number of bits for the input samples which the output sample was created from.

* * * * *